United States Patent
Suzuki et al.

(10) Patent No.: US 8,210,273 B2
(45) Date of Patent: Jul. 3, 2012

(54) ELECTRIC POWER TOOL, TOOL BODY, AND BATTERY PACK

(75) Inventors: Hitoshi Suzuki, Anjo (JP); Tadahiko Kobayakawa, Anjo (JP); Tomoo Muramatsu, Anjo (JP)

(73) Assignee: Makita Corporation, Anjo-shi (JP)

( * ) Notice: Subject to any disclaimer, the term of this patent is extended or adjusted under 35 U.S.C. 154(b) by 342 days.

(21) Appl. No.: 12/588,081

(22) Filed: Oct. 2, 2009

(65) Prior Publication Data
US 2010/0084150 A1  Apr. 8, 2010

(30) Foreign Application Priority Data

| Oct. 8, 2008 | (JP) | 2008-261825 |
| Nov. 10, 2008 | (JP) | 2008-287765 |
| Jan. 8, 2009 | (JP) | 2009-002596 |
| Jan. 16, 2009 | (JP) | 2009-007664 |

(51) Int. Cl.
*B23B 45/02* (2006.01)
(52) U.S. Cl. .......................... 173/2; 173/217
(58) Field of Classification Search .............. 173/2, 217; 320/106, 136
See application file for complete search history.

(56) References Cited

U.S. PATENT DOCUMENTS

| 3,952,239 | A | * | 4/1976 | Owings et al. ................ 320/113 |
| 3,999,110 | A | * | 12/1976 | Ramstrom et al. ............ 320/112 |
| 5,144,217 | A | * | 9/1992 | Gardner et al. ............... 320/110 |
| 5,671,815 | A | * | 9/1997 | Kabatnik et al. .............. 173/217 |
| 5,792,573 | A | * | 8/1998 | Pitzen et al. ..................... 429/97 |
| 5,872,444 | A |   | 2/1999 | Nagano et al. |
| 5,905,362 | A |   | 5/1999 | Nagano et al. |
| 6,008,620 | A |   | 12/1999 | Nagano et al. |
| 6,225,783 | B1 |   | 5/2001 | Nagano et al. |
| 6,229,280 | B1 | * | 5/2001 | Sakoh et al. .................. 320/106 |
| 6,607,041 | B2 | * | 8/2003 | Suzuki et al. ..................... 173/4 |
| 6,729,413 | B2 | * | 5/2004 | Turner et al. .................. 173/217 |
| 6,924,624 | B2 |   | 8/2005 | Baur et al. |
| 7,109,675 | B2 | * | 9/2006 | Matsunaga et al. ........... 318/433 |
| 7,492,124 | B2 |   | 2/2009 | Johnson et al. |
| 2002/0050364 | A1 | * | 5/2002 | Suzuki et al. ..................... 173/1 |
| 2002/0190693 | A1 |   | 12/2002 | Kitagawa et al. |
| 2005/0077878 | A1 |   | 4/2005 | Carrier et al. |
| 2006/0113100 | A1 | * | 6/2006 | Hsu et al. ...................... 173/217 |
| 2006/0180327 | A1 |   | 8/2006 | Nagasaka et al. |

(Continued)

FOREIGN PATENT DOCUMENTS

CN   1848591 A   10/2006

(Continued)

OTHER PUBLICATIONS

Extended European Search Report received Sep. 21, 2010 issued in European Patent Application No. 09012650.9.

(Continued)

*Primary Examiner* — Brian D Nash
(74) *Attorney, Agent, or Firm* — Oliff & Berridge, PLC

(57) ABSTRACT

An electric power tool includes a tool body and a battery pack. A terminal voltage setting unit of the tool body sets a voltage of a body side terminal to a first voltage when a command to drive a drive portion of the tool body is issued by a switch of the tool body. A voltage changing unit of the battery pack changes a voltage of a battery side terminal from the first voltage to a second voltage when supply of electric power from the battery pack to the drive portion is permitted.

11 Claims, 10 Drawing Sheets

U.S. PATENT DOCUMENTS

2006/0214627 A1    9/2006  Ito et al.

FOREIGN PATENT DOCUMENTS

| JP | A-8-182204   | 7/1996  |
|----|--------------|---------|
| JP | A-9-285026   | 10/1997 |
| JP | A-2003-264008| 9/2003  |
| JP | A-2006-218605| 8/2006  |
| JP | A-2006-280043| 10/2006 |
| JP | A-2007-82379 | 3/2007  |

OTHER PUBLICATIONS

Office Action issued in Chinese Application No. 200910179436.0 dated Jun. 15, 2011 (w/ Partial English Translation).

* cited by examiner

FIG. 5A

| Sequence No. | Operation Flow | \multicolumn{9}{c}{States of portions of electronic circuits in tool body 2 and battery pack 9} |
|---|---|---|---|---|---|---|---|---|---|---|

| Sequence No. | Operation Flow | MCU93 | SW1 | 11C, 12C | Q2 | Q1 | Q4 | Q3 | C1 | ZD1 |
|---|---|---|---|---|---|---|---|---|---|---|
| 1 | SW1 TURNED OFF (INITIAL STATE) | SLEEP MODE | OFF | OFF | NO POWER / OFF | NO POWER / OFF | OFF | NO POWER / OFF | NO POWER / LOW | NO POWER / LOW |
| 2 | SW1 TURNED ON | SLEEP MODE | ON | OFF | OFF | OFF | OFF | OFF | CHARGED | LEVEL SHIFTED |
| 3 | Vcc ACTIVATED | SLEEP MODE | ON | LEVEL SHIFTED | LEVEL SHIFTED | OFF | OFF | OFF | HIGH | HIGH |
| 4 | VOLTAGES AT 11C AND 12C: HIGH | SLEEP MODE | ON | HIGH | ON | OFF | OFF | LEVEL SHIFTED | HIGH | HIGH |
| 5 | Q3 ACTIVATED | WAKE-UP | ON | HIGH | ON | OFF | OFF | ON | HIGH | HIGH |
| 6 | MCU 93 RECOGNIZES ON STATE OF SW1 | WAKE-UP | ON | HIGH | ON | OFF | OFF | ON | HIGH | HIGH |
| 7 | MCU 93 SETS DISCHARGE CONTROL SIGNAL TO HIGH (DISCHARGE PERMITTED) | NORMAL MODE | ON | HIGH | ON | OFF | OFF | ON | HIGH | HIGH |
| 8 | Q4 ACTIVATED | NORMAL MODE | ON | HIGH | ON | OFF | ON | ON | HIGH | HIGH |
| 9 | VOLTAGES AT 11C AND 12C: LOW | NORMAL MODE | ON | LEVEL SHIFTED | LEVEL SHIFTED | OFF | ON | LEVEL SHIFTED | HIGH | HIGH |
| 10 | Q2 DEACTIVATED | NORMAL MODE | ON | LOW | OFF | OFF | ON | OFF | HIGH | HIGH |
| 11 | Q1 ACTIVATED | NORMAL MODE | ON | LOW | OFF | LEVEL SHIFTED | ON | OFF | HIGH | HIGH |
| 12 | M1 SUPPLIED WITH CONSTANT ELECTRIC POWER | NORMAL MODE | ON | LOW | OFF | ON | ON | OFF | HIGH | HIGH |

FIG. 5B

| SEQUENCE NO. | OPERATION FLOW | STATES OF PORTIONS OF ELECTRONIC CIRCUITS IN TOOL BODY 2 AND BATTERY PACK 9 | | | | | | | | |
|---|---|---|---|---|---|---|---|---|---|---|
| | | MCU93 | SW1 | 11C, 12C | Q2 | Q1 | Q4 | Q3 | C1 | ZD1 |
| 1 | SW1 TURNED ON: M1 TURNED OFF (INITIAL STATE) | NORMAL MODE | ON | LOW | OFF | ON | ON | OFF | HIGH | HIGH |
| 13 | MCU 93 RECOGNIZES OCCURRENCE OF OVER-CURRENT AND SETS DISCHARGE CONTROL SIGNAL TO LOW (DISCHARGE PROHIBITED) | | ON | LOW | OFF | ON | ON | OFF | HIGH | HIGH |
| 14 | Q4 DEACTIVATED | | ON | LOW | OFF | ON | OFF | OFF | | |
| 15 | VOLTAGES AT 11C AND 12C: HIGH | | ON | LEVEL SHIFTED | LEVEL SHIFTED | ON | OFF | OFF | | |
| 16 | Q2 ACTIVATED | | ON | HIGH | ON | LEVEL SHIFTED | OFF | OFF | | |
| 17 | Q1 DEACTIVATED | | ON | HIGH | ON | OFF | OFF | LEVEL SHIFTED | HIGH | HIGH |
| 18 | AUTOMATIC STOP MODE M1 TURNED OFF | | ON | HIGH | ON | OFF | OFF | ON | HIGH | HIGH |

FIG. 5C

| SEQUENCE NO. | OPERATION FLOW | MCU93 | SW1 | 11C, 12C | Q2 | Q1 | Q4 | Q3 | C1 | ZD1 |
|---|---|---|---|---|---|---|---|---|---|---|
| 1 | SW1 TURNED ON; M1 TURNED OFF AUTOMATIC STOP MODE (INITIAL STATE) | NORMAL MODE | ON | HIGH | ON | OFF | OFF | ON | HIGH | HIGH |
| 19 | USER RECOGNIZES AUTOMATIC STOP MODE | | ON | HIGH | ON | | | ON | HIGH | HIGH |
| 20 | SW1 TURNED OFF | | | LEVEL SHIFTED | LEVEL SHIFTED | | | LEVEL SHIFTED | DISCHARGE | LEVEL SHIFTED |
| 21 | Vcc GENERATION STOPPED | NORMAL MODE | OFF | LOW | OFF | OFF | OFF | OFF | LOW | LOW |
| 22 | VOLTAGES AT 11C AND 12C: LOW | | | | | | | | | |
| 23 | Q3 DEACTIVATED | | | | | | | | | |
| 24 | MCU 93 RECOGNIZES OFF STATE OF SW1 | | | | | | | | | |
| 25 | MCU 93 WAITS FOR ON STATE OF SW1 | | | | | | | | | |
| 26 | SHIFT TO SEQUENCE NO. 2 IF MCU 93 RECOGNIZES ON STATE OF SW1 / SHIFT TO SLEEP MODE (SEQUENCE NO. 1) IF MCU 93 DOES NOT RECOGNIZE ON STATE OF SW1 | | | | | | | | | |

STATES OF PORTIONS OF ELECTRONIC CIRCUITS IN TOOL BODY 2 AND BATTERY PACK 9

ELECTRIC POWER TOOL, TOOL BODY, AND BATTERY PACK

CROSS-REFERENCE TO RELATED APPLICATIONS

This application claims the benefit of Japanese Patent Application No. 2008-261825 filed Oct. 8, 2008, No. 2008-287765 filed Nov. 10, 2008, No. 2009-002596 filed Jan. 8, 2009, and No. 2009-007664 filed Jan. 16, 2009 in the Japan Patent Office, the disclosures of which are incorporated herein by reference.

BACKGROUND

The present invention relates to an electric power tool provided with a battery pack.

One example of conventional electric power tools disclosed in Unexamined Japanese Patent Publication No. 2006-280043 is configured such that a control signal that indicates whether or not an external switch of a tool body of an electric power tool is operated is outputted from the tool body to a battery pack via a pair of terminals. The one example is also configured such that another control signal that indicates whether or not supply of electric power from the battery pack to a motor in the tool body is permitted is inputted from the battery pack to the tool body via another pair of terminals.

SUMMARY

According to the above example, the two pairs of terminals are necessary in order to transfer these two kinds of control signals between the tool body and the battery pack. However, a reduction of the number of the terminals can be one method for simplifying the structure of the electric power tool and improving the degree of freedom in the design of the electric power tool.

It is preferable that one aspect of the present invention can provide a technology that can transfer between a tool body and a battery pack via one pair of terminals a signal that indicates whether or not a command to drive a drive portion of the tool body is issued by a switch operable from the outside of the tool body and a signal that indicates whether or not supply of electric power to the drive portion is permitted.

An electric power tool in a first aspect of the invention comprises a tool body and a battery pack.

The tool body comprises a body side terminal, a drive portion, a switch, a terminal voltage setting unit, and a connection control unit.

The body side terminal transfers an electric signal between the tool body and the battery pack. The drive portion is electrically connected with the battery pack and supplied with electric power from the battery pack to be driven. The switch is operable from outside of the tool body and issues one of a command to drive the drive portion and a command to stop the drive portion in accordance with operation to the switch. The terminal voltage setting unit sets a voltage of the body side terminal to a first voltage when the command to drive the drive portion is issued by the switch. The connection control unit electrically disconnects the battery pack and the drive section from each other, when the voltage of the body side terminal is set to the first voltage, and electrically connects the battery pack and the drive portion with each other when the voltage of the body side terminal is set to a second voltage different from the first voltage.

The battery pack comprises a battery side terminal, a command recognition unit, a permission determination unit, and a voltage changing unit. The battery side terminal is electrically connected with the body side terminal of the tool body. The command recognition unit generates a command recognition signal indicating that the command to drive the drive portion is issued by the switch of the tool body when a voltage of the battery side terminal is set to the first voltage. The permission determination unit determines whether or not supply of electric power from the battery pack to the drive portion should be permitted, based on a predetermined determination procedure including at least determination of a status of the command recognition signal. The voltage changing unit changes the voltage of the battery side terminal from the first voltage to the second voltage when supply of electric power from the battery pack to the drive portion is permitted by the permission determination unit.

In the electric power tool constituted as above, when the switch issues the command to drive the drive portion, the terminal voltage setting unit of the tool body sets the voltage of the body side terminal of the tool body to the first voltage. In this case, the connection control unit of the tool body electrically disconnects the battery pack and the drive portion from each other. When the voltage of the body side terminal is set to the first voltage, the voltage of the battery side terminal of the battery pack electrically connected with the body side terminal is also set to the first voltage, so that the command recognition unit of the battery pack generates the command recognition signal. Then, when the permission determination unit of the battery pack determines permission of supply of electric power from the battery pack to the drive portion, the voltage changing unit of the battery pack changes the voltage of the battery side terminal from the first voltage to the second voltage.

When the voltage of the battery side terminal changes into the second voltage, the voltage of the body side terminal of the tool body electrically connected with the battery side terminal also changes into the second voltage, so that the connection control unit of the tool body electrically connects the battery pack and the drive portion with each other.

That is, in the electric power tool of the first aspect, the fact that the command to drive the drive portion is issued by the switch is indicated by setting the voltage of the body side terminal and the voltage of the battery side terminal to the first voltage, and the permission to supply electric power to the drive portion is indicated by setting the voltage of the body side terminal and the voltage of the battery side terminal to the second voltage.

Therefore, in the electric power tool of the first aspect, a signal that indicates whether or not the command to drive the drive portion is issued by the switch and a signal that indicates whether or not supply of electric power to the drive portion is permitted can be transferred between the tool body and the battery pack via the one pair of terminals.

The switch of the tool body may be constituted in any manner to issue the command to drive the drive portion and the command to stop the drive portion from the outside of the tool body.

In a case where the battery pack is provided with a positive electrode to be electrically connected with the drive portion of the tool body, for example, the switch may be constituted to issue the command to drive the drive portion and the command to stop the drive portion by electrically connecting and disconnecting the positive electrode of the battery pack and the drive portion of the tool body. Further, in this case, the terminal voltage setting unit may be constituted to apply the first voltage to the body side terminal when the positive electrode of the battery pack and the drive portion of the tool body are electrically connected with each other by the switch.

As for the thus constituted electric power tool, when the positive electrode of the battery pack and the drive portion of the tool body are electrically connected with each other, the voltage of the body side terminal can be set to the first voltage.

The terminal voltage setting unit may be constituted, for example, to generate the first voltage from a voltage of the positive electrode of the battery pack to apply the generated first voltage to the body side terminal when the positive electrode of the battery pack and the drive portion of the tool body are electrically connected with each other by the switch.

In this case, the first voltage is generated only when the positive electrode of the battery pack and the drive portion of the tool body are electrically connected with each other. That is, the first voltage is generated only when the switch issues the command to drive the drive portion, thereby enabling inhibiting the voltage of the body side terminal and the voltage of the battery side terminal from being set to the first voltage despite the fact that the switch issues no command to drive the drive portion.

The voltage changing unit may be constituted in any manner to change the voltage of the battery side terminal from the first voltage to the second voltage.

For example, the voltage changing unit may be constituted to change the voltage of the battery side terminal from the first voltage to the second voltage by decreasing the first voltage or applying a voltage higher than the first voltage to the battery side terminal.

The battery pack may include a sleep mode shift unit that stops operations of a part of electronic circuits included in the battery pack, based on at least the status of the command recognition signal.

In this case, if the sleep mode shift unit is set in such a manner as to activate when the command recognition signal is not generated, for example, when the command to stop the drive portion is issued by the switch of the tool body, only the part of the electronic circuits included in the battery pack, instead of an entirety of the electronic circuits, stops. Accordingly, the drive portion can be started to be driven faster than the case of activating the entirety of the electronic circuits after the command to drive the drive portion is issued.

The determination procedure may include any determination to determine whether or not supply of electric power from the battery pack to the drive portion should be permitted.

If the battery pack is provided with an over-current determination unit that determines whether or not a magnitude of an electric current flowing from the battery pack to the tool body is greater than a predetermined current value, for example, the determination procedure may include a determination by the over-current determination unit.

In this case, for example, by setting the permission determination unit so as not to permit supply of electric power from the battery pack to the drive portion when the magnitude of the electric current flowing from the battery pack to the tool body is greater than the predetermined current value, it can be inhibited that a trouble occurs due to an excessive electric current flowing from the battery pack to the tool body.

If the battery pack is provided with an over-discharge determination unit that determines whether or not the battery pack is over-discharged, for example, the determination procedure may include a determination by the over-discharge determination unit.

In this case, for example, by setting the permission determination unit so as not to permit supply of electric power from the battery pack to the drive portion when the battery pack is over-discharged, it can be inhibited that supply of electric power from the over-discharged battery pack to the drive portion is performed and thus a trouble occurs in the battery pack.

If the battery pack is provided with a temperature determination unit that determines whether or not a temperature of the battery pack is higher than a predetermined temperature, for example, the determination procedure may include a determination by the temperature determination unit.

In this case, for example, by setting the permission determination unit so as not to permit supply of electric power from the battery pack to the drive portion when the temperature of the battery pack is higher than the predetermined temperature, it can be inhibited that supply of electric power from the battery pack having excessively high temperature to the drive portion is performed and thus a trouble occurs in the battery pack.

The battery pack may be undetachably provided to the tool body. Alternatively, the battery pack may be detachably attached to the tool body.

In a case where the battery pack is detachably attached to the tool body, the battery pack can be replaced easily.

A tool body in a second aspect of the invention comprises a body side terminal, a drive portion, a switch, a terminal voltage setting unit, and a connection control unit. The body side terminal transfers an electric signal between the tool body and a battery pack. The drive portion is electrically connected with the battery pack and supplied with electric power from the battery pack to be driven. The switch is operable from outside of the tool body and issues one of a command to drive the drive portion and a command to stop the drive portion in accordance with operation to the switch. The terminal voltage setting unit sets a voltage of the body side terminal to a first voltage when the command to drive the drive portion is issued by the switch. The connection control unit electrically disconnects the battery pack and the drive portion from each other, when the voltage of the body side terminal is set to the first voltage, and electrically connects the battery pack and the drive portion with each other when the voltage of the body side terminal is set to a second voltage different from the first voltage.

In other words, the tool body is for the electric power tool in the first aspect and can constitute a part of the electric power tool in the first aspect.

A battery pack in a third aspect of the invention is for an electric power tool that supplies electric power to a tool body of the electric power tool. The battery pack comprises a battery side terminal, a command recognition unit, a permission determination unit, and a voltage changing unit. The battery side terminal transfers an electrical signal between the battery pack and the tool body. The command recognition unit generates a command recognition signal indicating that a command to drive a drive portion provided to the tool body is issued by a switch provided to the tool body when a voltage of the battery side terminal is set to a first voltage. The permission determination unit determines whether or not supply of electric power from the battery pack to the drive portion should be permitted based on a predetermined determination procedure including at least determination of a status of the command recognition signal. The voltage changing unit changes the voltage of the battery side terminal from the first voltage to a second voltage different from the first voltage when supply of electric power from the battery pack to the drive portion is permitted by the permission determination unit.

In other words, the battery pack is for the electric power tool in the first aspect and can constitute a part of the electric power tool in the first aspect.

BRIEF DESCRIPTION OF THE DRAWINGS

The present invention will now be described below by way of example with reference to the accompanying drawings, in which:

FIGS. 5A-5C are tables showing operation states of the respective portions of the electronic circuits in the first embodiment, in which FIG. 5A is a table showing the operation states of the respective portions of the electronic circuits from a point in time when a main switch is turned on to a point in time when a drive motor starts to be driven, FIG. 5B is a table showing the operation states of the respective portions of the electronic circuits in a case where an over-current has occurred, and FIG. 5C is a table showing the operation states of the respective portions of the electronic circuits in a case where a user has recognized an automatic stop mode;

FIGS. 6A and 6B are flowcharts showing a flow of discharge control process executed by a main control unit in the first embodiment, in which FIG. 6A shows steps of the discharge control process from its beginning to its midstream, and FIG. 6B shows the remaining steps of the discharge control processing.

DETAILED DESCRIPTION OF THE PREFERRED EMBODIMENTS

First Embodiment

Figure 1:
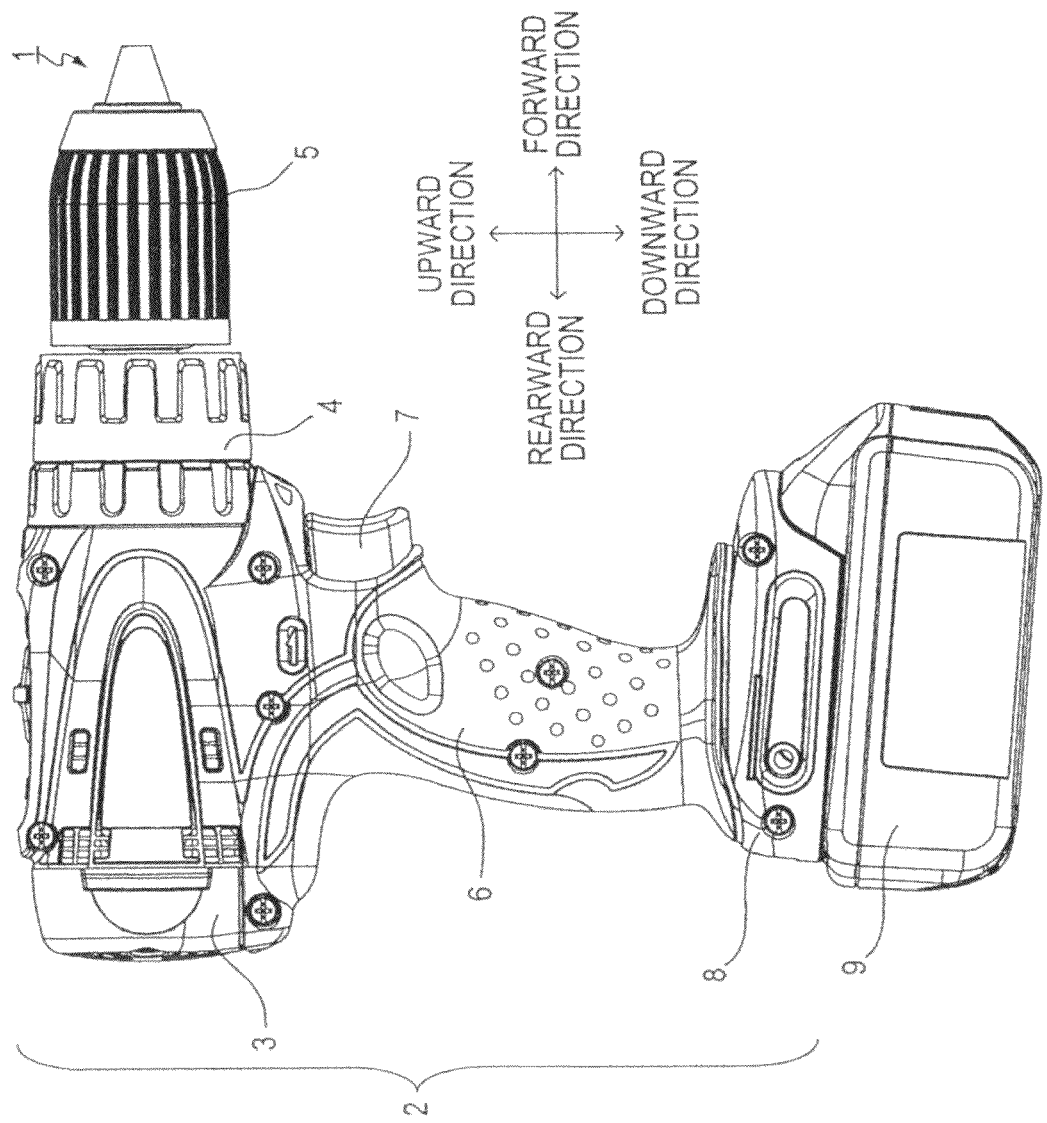
FIG. 1 is a side view of an electric power tool in a first embodiment.

As shown in FIG. 1, an electric power tool 1 in the present first embodiment is constituted as a so-called driver drill.

More specifically, a tool body 2 of the electric power tool 1 includes a motor housing 3, a gear housing 4 positioned ahead of the motor housing 3, a drill chuck 5 positioned ahead of the gear housing 4, and a handgrip 6 positioned below the motor housing 3.

The motor housing 3 houses a drive motor M1 (see FIG. 3) that generates driving force to rotationally drive the drill chuck 5.

The gear housing 4 houses a gear mechanism (not shown) to transmit the driving force from the drive motor M1 to the drill chuck 5.

The drill chuck 5 includes a mounting mechanism (not shown), to which a tool bit (not shown) is detachably attached, at the front end of the drill chuck 5.

Figure 2:
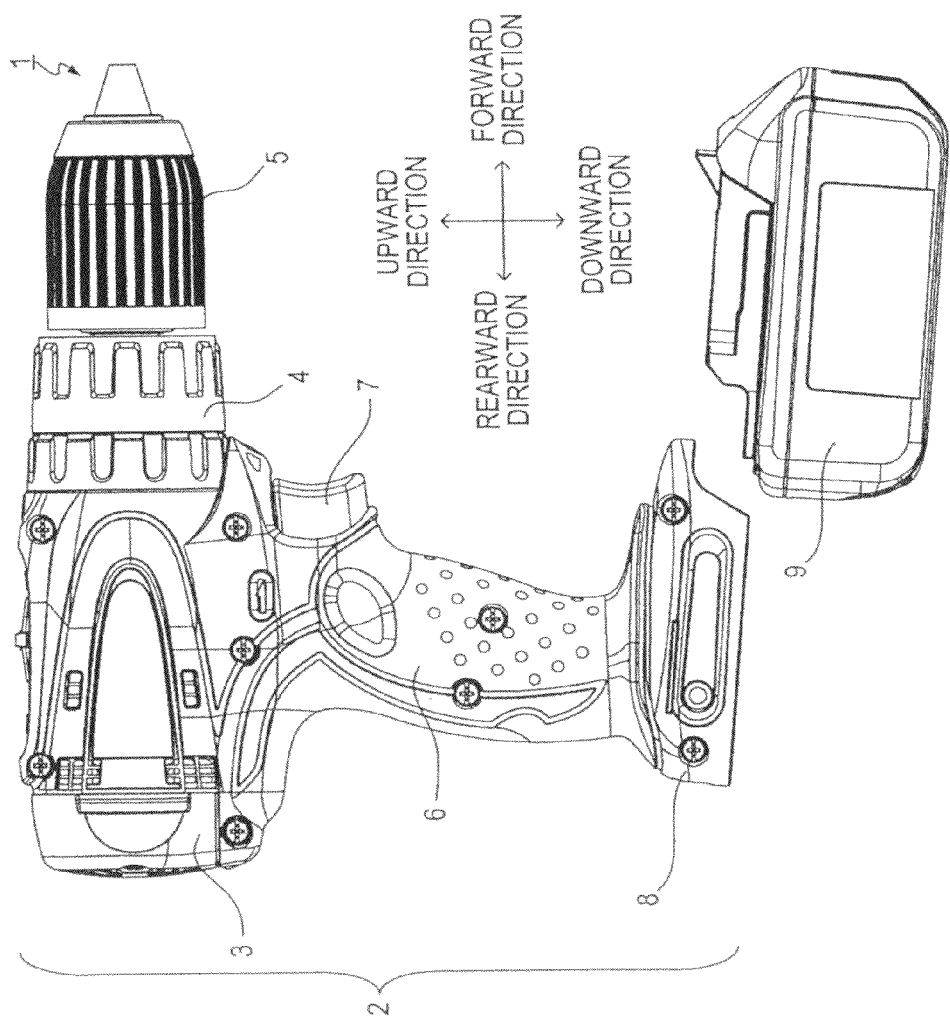
FIG. 2 is a side view showing the electric power tool in the first embodiment in which a battery pack is detached from a tool body of the electric power tool.

The handgrip 6 is formed so that a user of the electric power tool 1 can grip the handgrip 6 in one hand. Ahead of the upper portion of the handgrip 6, a trigger switch 7 is provided for the user of the electric power tool 1 to drive and stop the drive motor M1. At the lower end of the handgrip 6, a battery pack attaching portion 8 is provided to detachably attach a battery pack 9 to the tool body 2. More specifically, as shown in FIG. 2, the battery pack attaching portion 8 is configured so that the user of the electric power tool 1 can detach the battery pack 9 from the battery pack attaching portion 8 by sliding the battery pack 9 forward.

Figure 3:
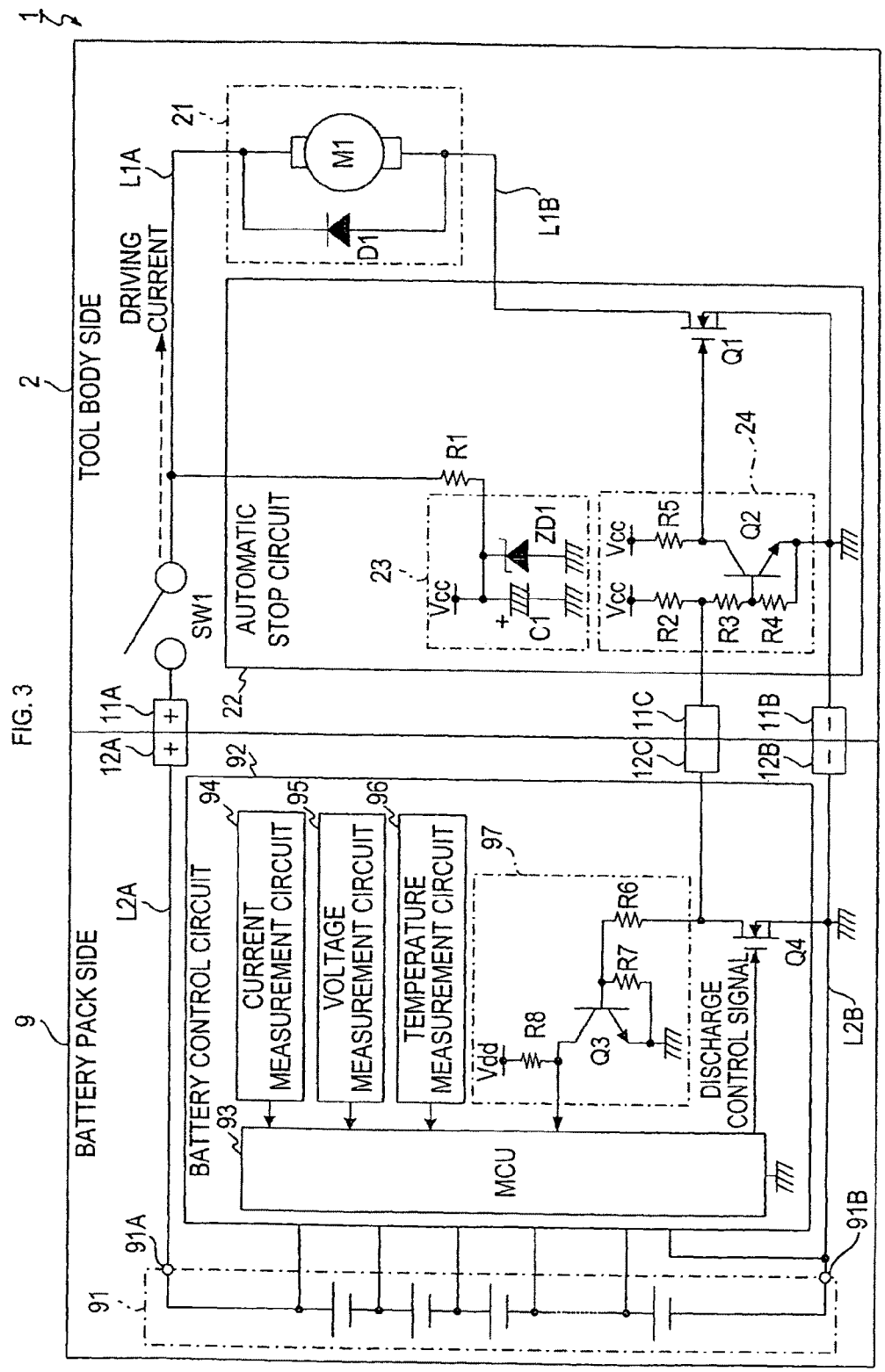
FIG. 3 is a circuit diagram showing a configuration of a part of electronic circuits included in the electric power tool.

As shown in FIG. 3, the tool body 2 includes a main switch SW1, a positive side terminal 11A, a negative side terminal 11B, a signal terminal 11C, a drive circuit 21, and an automatic stop circuit 22.

The main switch SW1 is interlocked with the aforementioned trigger switch 7 in such a manner that the main switch SW1 is turned on when the trigger switch 7 is pulled, while the main switch SW1 is turned off when the trigger switch 7 is released. Turning on the main switch SW1 corresponds to issuing a command to drive the drive motor M1. Turning off the main switch SW1 corresponds to issuing a command to stop the drive motor M1.

The drive circuit 21 includes the aforementioned drive motor M1 and a diode D1.

In the first embodiment, the drive motor M1 is a brushed direct-current (DC) motor, one terminal (positive side terminal) of which is connected to a positive side power line L1A provided in the tool body 2 and the other terminal (negative side terminal) of which is connected to a negative side power line L1B provided in the tool body 2. The positive side power line L1A is connected to the positive side terminal 11A via the main switch SW1.

The diode D1 is a so-called flywheel diode, in which a cathode thereof is connected to the positive side terminal of the drive motor M1 and an anode thereof is connected to the negative side terminal of the drive motor M1 so that spike voltages can be removed which would occur on the drive motor M1 when an electric current (driving current) flowing into the drive motor M1 is cut off.

The automatic stop circuit 22 includes transistor Q1, a resistor R1, a control voltage generation circuit 23, and a signal input/output circuit 24.

The transistor Q1 is an n-channel type MOSFET. A drain and a source of the transistor Q1 are inserted into the negative side power line L1B, while a gate of the transistor Q1 is connected to a collector of a later-described transistor Q2 in the signal input/output circuit 24. The negative side power line L1B is connected to the negative side terminal 11B at the opposite end thereof to the one end connected to the negative side terminal of the drive motor M1. That is, when the transistor Q1 is turned on, the negative side terminal 11B and the negative side terminal of the drive motor M1 are electrically connected with each other, and when the transistor Q1 is turned off, the negative side terminal 11B and the negative side terminal of the drive motor M1 are electrically disconnected from each other.

The control voltage generation circuit 23 includes a zener diode ZD1 and a capacitor C1.

In the zener diode ZD1, a cathode thereof is connected to the positive side power line L1A via the resistor R1 and an anode thereof is connected to a ground (GND), which is a reference electric potential in the tool body 2.

The capacitor C1 is an electrolytic capacitor, a positive electrode terminal of which is connected together with the cathode of the zener diode ZD1 to the positive side power line L1A via the resistor R1 and a negative electrode terminal of which is connected to the ground in the tool body 2.

In the thus configured control voltage generation circuit 23, when the main switch SW1 is turned on, a voltage (36VDC in the first embodiment) applied from the positive side power line L1A is lowered through the zener diode ZD1 to a predetermined voltage (5VDC in the first embodiment), and the capacitor C1 is charged by the lowered voltage. Then, a voltage of the capacitor C1 is applied to the various circuits included in the tool body 2 as a control voltage Vcc to operate the various circuits.

The signal input/output circuit 24 includes a transistor Q2 and resistors R2, R3, R4, and R5.

The resistor R2 is applied with the control voltage Vcc at one end thereof and is connected to the signal terminal 11C at the other end thereof.

The transistor Q2 is an NPN type bipolar transistor. A base of the transistor Q2 is connected to the signal terminal 11C via the resistor R3 as well as to the ground via the resistor R4. That is, the resistors R2, R3, and R4 are connected in series. It is to be noted that, in the first embodiment, the respective resistance values of the resistors R2, R3, and R4 are set so that the voltage at the signal terminal 11C is substantially equal to the control voltage Vcc when the control voltage Vcc has reached the predetermined voltage, and the transistor Q2 is turned on.

The collector of the transistor Q2 is connected to the gate of the transistor Q1 as described above and an emitter of the transistor Q2 is connected to the ground in the tool body 2.

The resistor R5 is applied with the control voltage Vcc at one end thereof and is connected to the collector of the transistor Q2 at the other end thereof.

It is to be noted that in the automatic stop circuit 22 of the first embodiment, the collector of the transistor Q2 is directly connected to the gate of the transistor Q1 in order to simplify the explanation; however, the collector of the transistor Q2 may be connected to the gate of the transistor Q1 via a switching circuit to switch the transistor Q1. In this case, a PWM signal having a duty ratio corresponding to the voltage at the collector of the transistor Q2 may be generated in the switching circuit to be then inputted to the gate of the transistor Q1.

The battery pack 9 includes a positive side terminal 12A, a negative side terminal 12B, a signal terminal 12C, a battery 91, and a battery control circuit 92.

The positive side terminal 12A is connected with the positive side terminal 11A of the tool body 2.

The negative side terminal 12B is connected with the negative side terminal 11B of the tool body 2.

The signal terminal 12C is connected with the signal terminal 11C of the tool body 2.

The battery 91 has a positive side terminal 91A and a negative side terminal 91B respectively connected to the positive side terminal 12A and the negative side terminal 12B via the positive side power line L2A and the negative side power line L2B provided in the battery pack 9. Further, the battery 91 has a plurality of battery cells (10 battery cells in the first embodiment), which are connected in series between the positive side terminal 91A and the negative side terminal 91B. That is, in the battery 91, a driving voltage (36VDC in the first embodiment) to drive the drive motor M1 is generated by the plurality of battery cells connected in series. Each of the battery cells in the first embodiment is a lithium-ion rechargeable battery, which produces a DC voltage of 3.6 V.

The battery control circuit 92 includes a main control unit (MCU) 93, a current measurement circuit 94, a voltage measurement circuit 95, a temperature measurement circuit 96, a switch operation detection circuit 97, and a transistor Q4.

The MCU 93 is a known microcomputer that includes therein at least a CPU, a ROM, a RAM, a rewritable nonvolatile memory, an input/output (I/O) port, and an analog/digital (A/D) converter and operates in accordance with various programs stored in the ROM therein.

The current measurement circuit 94 is configured so as to output an analog-format current measurement signal that has a voltage value corresponding to a magnitude of an electric current that flows out of or flows into the positive side terminal 91A of the battery 91 or an electric current that flows into or flows out of the negative side terminal 91B of the battery 91.

The voltage measurement circuit 95 is configured so as to measure the voltages of the respective battery cells in the battery 91 in sequence and output an analog-format voltage measurement signal that has a voltage value corresponding to the measured voltage.

The temperature measurement circuit 96 includes a thermistor and is configured so as to output an analog-format temperature measurement signal having a voltage value corresponding to an ambient temperature.

The switch operation detection circuit 97 includes a transistor Q3 and resistors R6, R7, and R8.

The transistor Q3 is an NPN type bipolar transistor. A base of the transistor Q3 is connected to the signal terminal 12C via the resistor R6 as well as to the ground in the battery pack 9 via the resistor R7. In the first embodiment, the negative side power line L2B is connected to the ground in the battery pack 9, so that the ground in the battery pack 9 has the same electric potential as the electric potential of the negative side power line L2B and, consequently, the electric potential of the negative electrode of the battery 91.

Further, the transistor Q3 has a Collector thereof connected to an input port of the MCU 93 and an emitter thereof connected to the ground in the battery pack 9.

The resistor R8 has one end thereof applied with a control voltage Vdd (5VDC in the first embodiment) generated by a not shown voltage generation circuit included in the battery pack 9 and the other end thereof connected to the collector of the transistor Q3.

The transistor Q4 is an N-channel type MOSFET and has a gate thereof connected to an output port of the MCU 93. The transistor Q4 has a drain thereof connected to the signal terminal 12C and a source thereof connected to the ground in the battery pack 9.

Each portion of the thus constituted electronic circuits in the tool body 2 and the battery pack 9 operates as shown in FIGS. 4, 5A, 5B and 5C.

Figure 4:
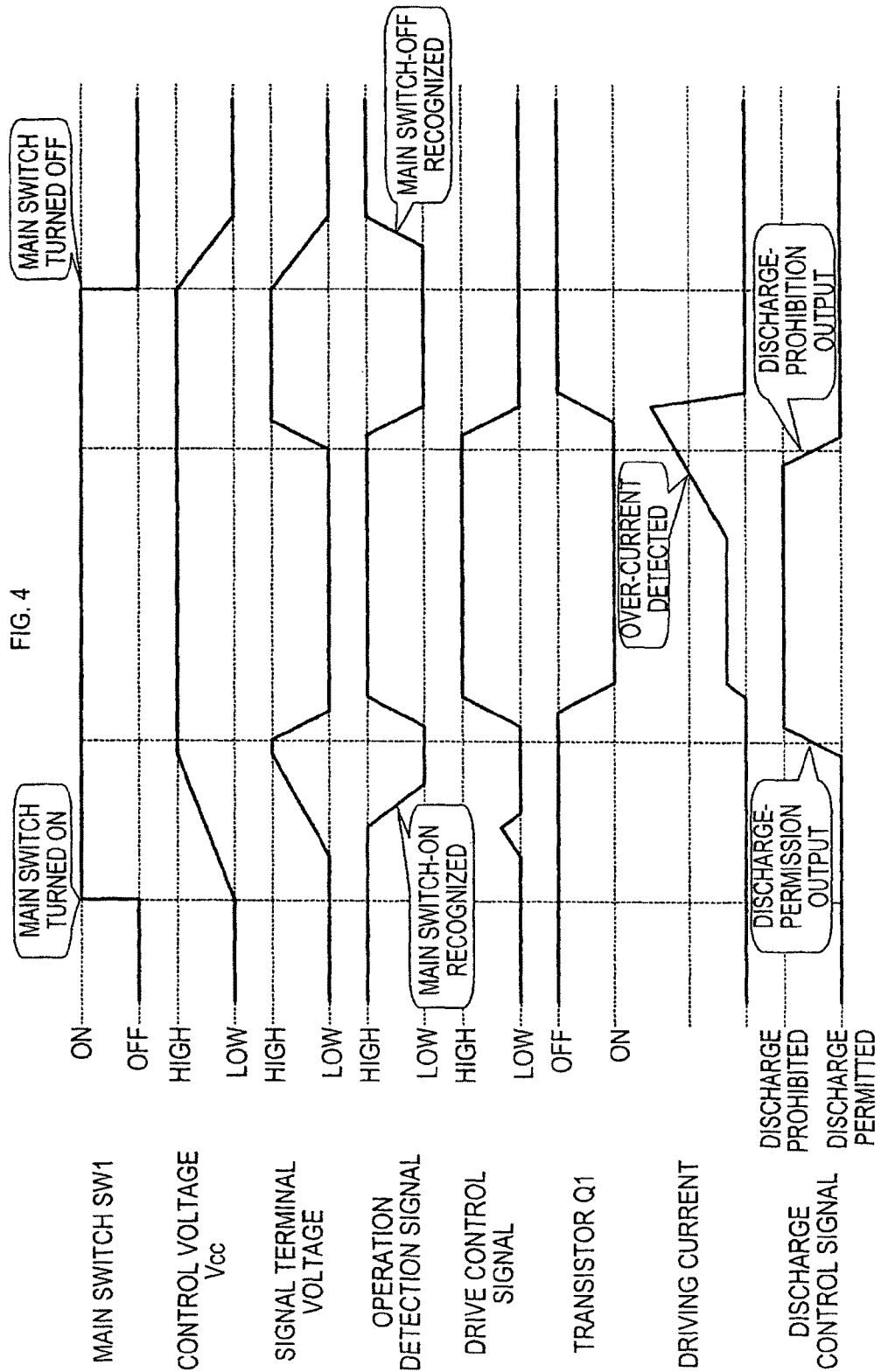
FIG. 4 is a timing chart showing operations of respective portions of the electronic circuits in the first embodiment.
Figure 5:
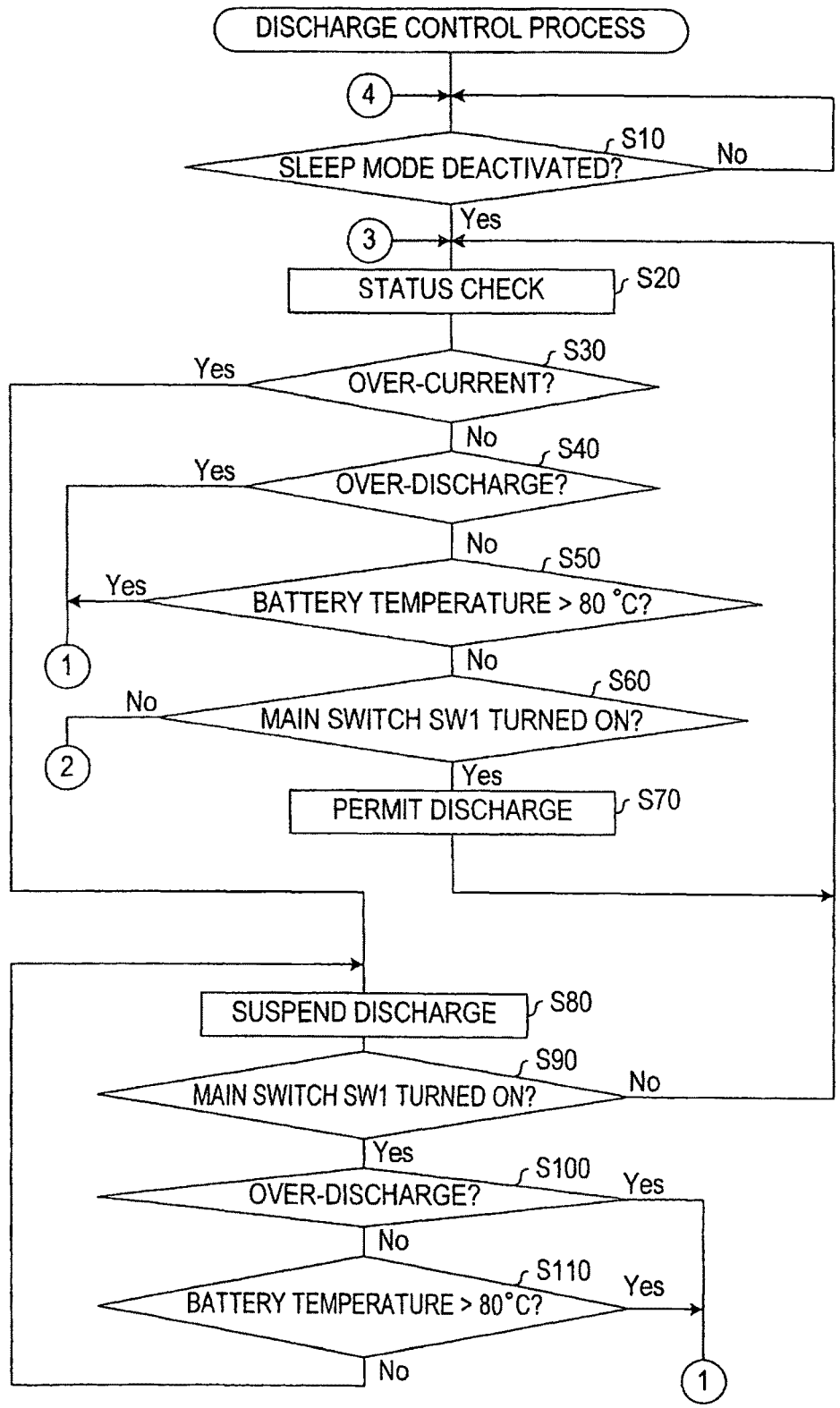

As shown in FIGS. 4 and 5A, in a state where the trigger switch 7 is released and the main switch SW1 is turned off, the operation mode of the MCU 93 is set to a sleep mode. In this sleep mode, the MCU 93 is on standby by operating a part of the electronic circuits included therein instead of stopping all of the electronic circuits included therein. In other words, the MCU 93 shifts into the sleep mode to thereby reduce power consumption thereof lower than power consumption thereof in the normal time (in the normal mode).

When the trigger switch 7 is pulled to turn on the main switch SW1, the control voltage Vcc generated by the control voltage generation circuit 23 is increased to reach a predetermined voltage, so that the control voltage Vcc becomes active. In this case, a logical level is set to LOW of the voltage in the discharge control signal outputted to the gate of the transistor Q4 from the MCU 93 to turn on/off the transistor Q4. Therefore, the transistor Q4 is turned off and logical levels of the voltages at the respective signal terminals 11C and 12C are set to HIGH. When the logical levels of the voltages at the respective signal terminals 11C and 12C are set to HIGH, the transistor Q3 in the switch operation detection circuit 97 is turned on, to set to LOW a logical level of the voltage in a signal (operation detection signal) inputted to the MCU 93 from the collector of the transistor Q3. As the logical level of the voltage in the operation detection signal is thus set from HIGH to LOW, the MCU 93 recognizes that the main switch SW1 is turned on, to wake up (be activated) from the sleep mode, thus shifting into the normal mode.

In a state where the logical levels of the voltages at the respective signal terminals 11C and 12C are set to HIGH, the transistor Q2 in the signal input/output circuit 24 is turned on, and a logical level of the voltage in a signal (drive control signal) inputted to the gate of the transistor Q1 is set to LOW. Thereby the transistor Q1 is turned off, and a drive current supplied from the battery 91 to drive the drive motor M1 is cut off.

When the MCU 93 recognizes that the main switch SW1 is turned on, the MCU 93 sets the logical level of the voltage in the discharge control signal to HIGH, to permit discharge from the battery 91 to the drive motor M1. Thereby the transistor Q4 is turned on, which in turn sets to LOW the logical levels of the voltages at the respective signal terminals 11C and 12C, thus turning off the transistor Q2 in the signal input/output circuit 24. When the transistor Q2 is turned off, the logical level of the voltage in the drive control signal inputted to the gate of the transistor Q1 is set to HIGH to turn on the transistor Q1, thus starting to drive the drive motor M1.

As shown in FIGS. 4 and 5B, when the MCU 93 recognizes that an over-current occurs after the start to drive the drive motor M1, the MCU 93 sets the logical level of the voltage in the discharge control signal to LOW, to prohibit discharge from the battery 91 to the drive motor M1.

When the logical level of the voltage in the discharge control signal is set to LOW, the transistor Q4 is turned off, to set to HIGH the logical levels of the voltages at the respective signal terminals 11C and 12C. When the logical levels of the voltages at the respective signal terminals 11C and 12C are set to HIGH, the transistor Q2 in the signal input/output circuit 24 is turned on, to set the logical level of the voltage in the drive control signal to LOW, thus stopping the drive motor M1. That is, the drive motor M1 automatically stops (automatic stop mode) despite the fact that the trigger switch 7 is pulled to turn on the main switch SW1.

As shown in FIGS. 4 and 5C, when the trigger switch 7 is released to turn off the main switch SW1 as the user has recognized a shift of the electric power tool 1 into the automatic stop mode, generation of the control voltage Vcc is stopped in the control voltage generation circuit 23. When the generation of the control voltage Vcc is stopped, the logical levels of the voltages at the respective signal terminals 11C and 12C are set to LOW, so that the transistor Q3 in the switch operation detection circuit 97 is turned off. When the transistor Q3 is turned off, the logical level of the voltage in the operation detection signal is set to HIGH. As the logical level of the voltage in the operation detection signal is set to HIGH, the MCU 93 recognizes that the main switch SW1 is turned off.

When the MCU 93 recognizes that the main switch SW1 is turned off, the MCU 93 waits until the main switch SW1 is turned on.

Then, if the MCU 93 recognizes that the main switch SW1 is turned on, the MCU 93 sets the logical level of the voltage in the discharge control signal to HIGH, to permit discharge. If the MCU 93 does not recognize that the main switch SW1 is turned on, the MCU 93 shifts into the sleep mode.

Now, a process executed by the MCU 93 to realize the above operations will be described specifically.

Figure 6:
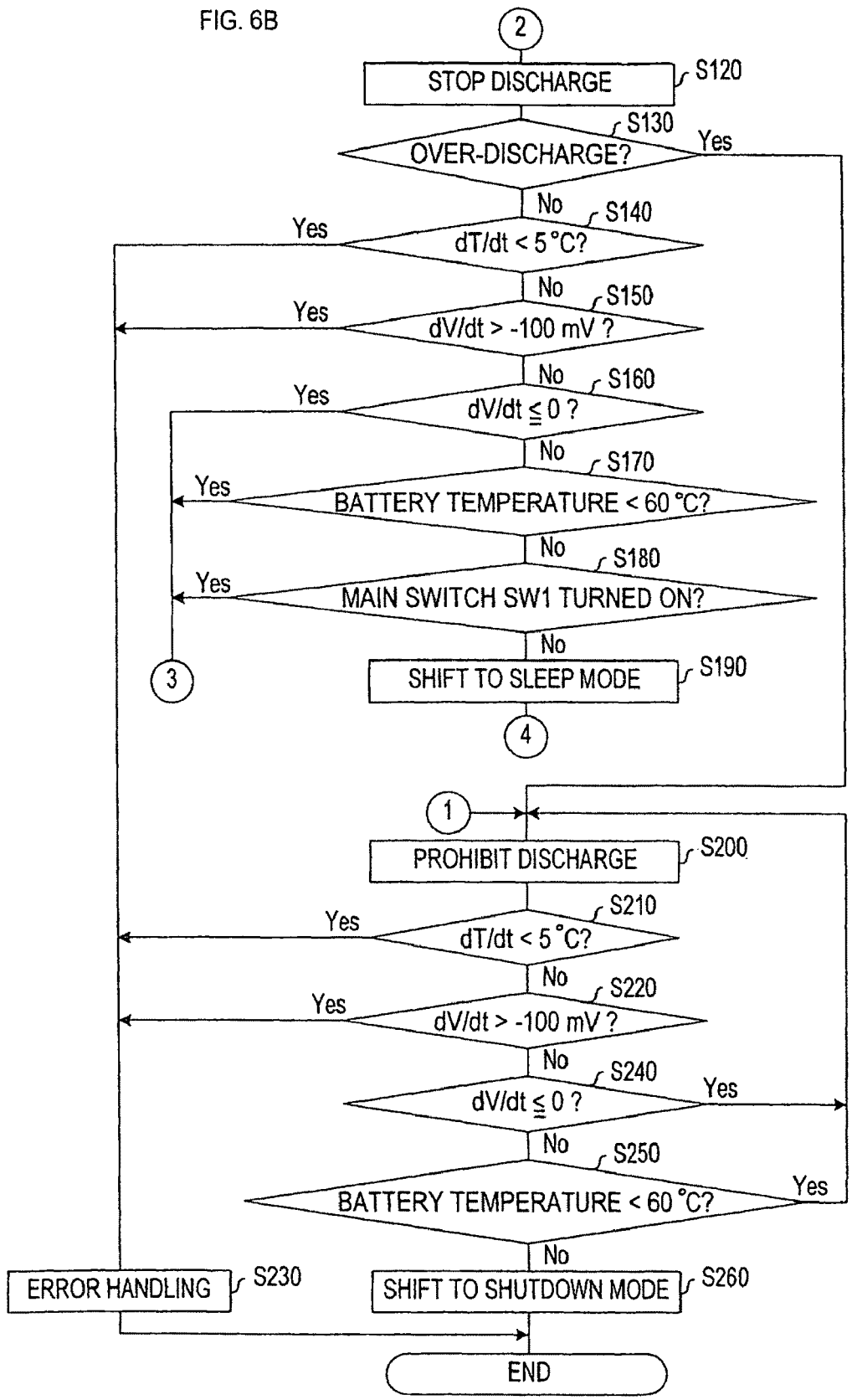

As shown in FIGS. 6A and 6B, in the present process, it is firstly determined whether or not a command to deactivate the sleep mode is issued (S10). More specifically, by determining whether or not the logical level of the voltage in the operation detection signal is set from HIGH to LOW, the determination is made as to whether or not the command to deactivate the sleep mode is issued.

When the command to deactivate the sleep mode is not issued (S10: No), the determination is repeatedly made as to whether or not the command to deactivate the sleep mode is issued until the command is issued.

When the command to deactivate the sleep mode is issued (S10: Yes), check is made on statuses of the MCU 93 and the battery pack 9 (S20). More specifically, check is made on the statuses of the MCU 93 and the battery pack 9 based on various flags set in the nonvolatile memory included in the MCU 93 by referencing the nonvolatile memory. The various flags indicate the states of the MCU 93, the battery pack 9, etc.

After completion of the status check, a determination is made as to whether or not an over-current has occurred, based on the current measurement signal inputted from the current measurement circuit 94 (S30); that is, a determination is made as to whether or not an electric current flowing through the positive side power line L2A or the negative side power line L2B is greater than a predetermined current value. When the over-current has not occurred (S30: No), a determination is made as to whether or not over-discharge has occurred, based on the voltage measurement signal inputted from the voltage measurement circuit 95 (S40).

When over-discharge has occurred (S40: Yes), the process immediately proceeds to later-described S200. When over-discharge has not occurred (S40: No), a determination is made as to whether or not the temperature of the battery pack 9 (battery temperature) is higher than, for example, 80° C. based on the temperature measurement signal inputted from the temperature measurement circuit 96 (S50).

When the battery temperature is higher than 80° C. (S50: Yes), the process immediately proceeds to the later-described 5200. When the battery temperature is not equal to or lower than 80° C. (S50: No), a determination is made as to whether or not the main switch SW1 is turned on, based on the operation detection signal (S60).

When the main switch SW1 is turned on (S60: yes), the logical level of the voltage in the discharge control signal is set to HIGH, to permit discharge and a discharge permission flag that indicates the permission of discharge is set (S70). When the main switch SW1 is turned off (S60: No), the present process immediately proceeds to the later-described S120.

When an over-current has occurred at S30 (S30: Yes), the logical level of the voltage in the discharge control signal is set to LOW to prohibit discharge and a suspension flag that indicates the suspension of discharge is set (S80). Then, a determination is made as to whether or not the main switch SW1 is turned on based on the operation detection signal (S90). When the main switch SW1 is turned off (S90: No), the present process proceeds to the aforementioned S20. When the main switch SW1 is turned on (S90: Yes), a determination is made as to whether or not over-discharge has occurred based on the voltage measurement signal (S100). When over-discharge has occurred (S100: Yes), the present process proceeds to later-described 5200. When over-discharge has not occurred (S100: No), a determination is made as to whether or not the battery temperature is higher than, for example, 80° C. based on the temperature measurement signal (S110). When the battery temperature is higher than 80° C. (S110: Yes), the process proceeds to later-described S200. When the battery temperature is equal to or lower than 80° C. (S110: No), the present process proceeds to the aforementioned S80.

At S120, the logical level of the voltage in the discharge control signal is set to LOW to prohibit discharge and a discharge stop flag which indicates that discharge is stopped is set (S120). Then, a determination is made as to whether or not over-discharge has occurred based on the voltage measurement signal (S130). When over-discharge has occurred (S130: Yes), the present process proceeds to the later-described S200. When over-discharge has not occurred (S130: No), a determination is made as to whether or not an amount of change dT/dt in the battery temperature is less than, for example, 5° C. based on the temperature measurement signal (S140). When the amount of change dT/dt is less than 5° C. (S140: Yes), the present process proceeds to later-described S230. When the amount of change dT/dt is equal to or higher than 5° C. (S140: No), a determination is made as to whether or not an amount of change dV/dt in voltage at each of the battery cells is larger than, for example, −100 mV based on the voltage measurement signal (S150).

When the amount of change dV/dt is larger than −100 mV (that is, a declining trend is small) (S150: Yes), the present process proceeds to the later-described S230. When the amount of change dV/dt is equal to or less than −100 mV (that is, the declining trend is large) (S150: No), a determination is made as to whether or not the amount of change dV/dt is equal to or less than zero (S160). When the amount of change dV/dt is equal to or less than zero (S160: Yes), that is, when the voltages of the battery cells are all stable, the present process proceeds to the aforementioned S20. When the amount of change dV/dt is larger than zero (S160: No), that is, when the voltage of any one of the battery cells is increased, a determination is made as to whether or not the battery temperature is lower than, for example, 60° C. based on the temperature measurement signal (S170).

When the battery temperature is lower than 60° C. (S170: Yes), the present process proceeds to the aforementioned S20. When the battery temperature is equal to or higher than 60° C. (S170: No), a determination is made as to whether or not the main switch SW1 is turned on, based on the operation detection signal (S180). When the main switch SW1 is turned on (S180: Yes), the present process proceeds to the aforementioned S20. When the main switch SW1 is turned off (S180: No), the MCU 93 shifts into the sleep mode (S190) and then the present process proceeds to the aforementioned S10.

At S200, the logical level of the voltage in the discharge control signal is set to LOW to prohibit discharge and a discharge prohibition flag which indicates the prohibition of discharge is set (S200). Then, a determination is made as to whether or not the amount of change dT/dt is less than, for example, 5° C. based on the temperature measurement signal (S210). When the amount of change dT/dt is less than 5° C. (S210: Yes), the present process proceeds to the later described S230. When the amount of change dT/dt is equal to or higher than 5° C. (S210: No), a determination is made as to whether or not the amount of change dV/dt at each of the battery cells is larger than, for example, −100 mV (S220). When the amount of change dV/dt is larger than −100 mV (that is, the declining trend is small), error handling is performed (S230), to then end the present process. In the error handling at S230, specifically, a failure detection flag is set which indicates that a failure is detected and the MCU 93 shifts into a charge/discharge prohibition mode in which charge and discharge are both prohibited.

When the amount of change dV/dt is equal to or less than −100 mV (that is, the declining trend is large) (S220: No), a determination is made as to whether or not the amount of change dV/dt is equal to or less than zero (S240). When the amount of change dV/dt is equal to or less than zero (S240: Yes), that is, when the voltages of the battery cells are all stable, the present process proceeds to the aforementioned 5200.

When the amount of change dV/dt is larger than zero (S240: No), that is, when the voltage of any one of the battery cells is increased, a determination is made as to whether or not the battery temperature is lower than, for example, 60° C. (S250). When the battery temperature is lower than 60° C. (S250: Yes), the present process proceeds to the aforementioned S200. When the battery temperature is equal to or higher than 60° C. (S250: No), the MCU 93 shifts into a shutdown mode (S260) to end the present process. When the MCU 93 shifts into the shutdown mode, the MCU 93 issues a command to a circuit (not shown) that turns on/off supply of electric power to all the electronic circuits included in the battery pack 9 to turn off the supply, thus stopping all of these electronic circuits.

In such a manner described as above, in the electric power tool 1 of the first embodiment, the fact that a command to drive the drive motor M1 is issued by the trigger switch 7 is indicated by setting the logical levels of the voltages at the respective signal terminals 11C and 12C to HIGH, while the fact that supply of electric power to the drive motor M1 is permitted is indicated by setting the logical levels of the voltages at the respective signal terminals 11C and 12C to LOW.

Therefore, in the electric power tool 1, the signal that indicates whether or not the command to drive the drive motor M1 is issued and the signal that indicates whether or not supply of electric power to the drive motor M1 is permitted can be transferred between the tool body 2 and the battery pack 9 via the one pair of signal terminals 11C and 12C.

Further, in the electric power tool 1, the control voltage Vcc is generated only when the positive side terminal 12A of the battery pack 9 and the drive motor M1 are electrically connected with each other. That is, since the control voltage Vcc is generated only when the command to drive the drive motor M1 is issued by the trigger switch 7, it can be inhibited that the logical levels of the respective voltages at the signal terminals 11C and 12C are set to HIGH despite the fact that the command to drive the drive motor M1 is not issued by the trigger switch 7.

In the electric power tool 1, the MCU 93 is set in the sleep mode in a condition where the battery pack 9 is attached to the tool body 2 and the trigger switch 7 is yet to be pulled (that is, in a condition where the logical level of the voltage in the operation detection signal is HIGH). It is therefore possible to start driving the drive motor M1 quickly when the trigger switch 7 is pulled.

In the electric power tool 1, discharge to the tool body 2 is prohibited when an over-current occurs, and thus it is inhibited that a trouble occurs due to the over-current.

Since in the electric power tool 1, discharge to the tool body 2 is prohibited when the battery pack 9 is over-discharged, it can be inhibited that supply of electric power to the drive motor M1 from the over-discharged battery pack 9, and thus a trouble occurs on the battery pack 9.

Further, in the electric power tool 1, discharge to the tool body 2 is prohibited when the temperature of the battery pack 9 is higher than 80° C. It therefore can be inhibited that supply of electric power to the drive motor M1 from the battery pack 9 with excessively high temperature, and thus a trouble occurs on the battery pack 9.

Moreover, in the electric power tool 1, the battery pack 9 is detachably attached to the tool body 2 and so can be replaced easily.

Second Embodiment

Next, a second embodiment of the invention will be described.

An electric power tool in the second embodiment can be simply obtained by partially modifying the electric power tool in the first embodiment.

Therefore, the same reference numbers are used to components that are the same as in the first embodiment, and repetitive description on the same components will be omitted to describe only the different components.

Figure 7:
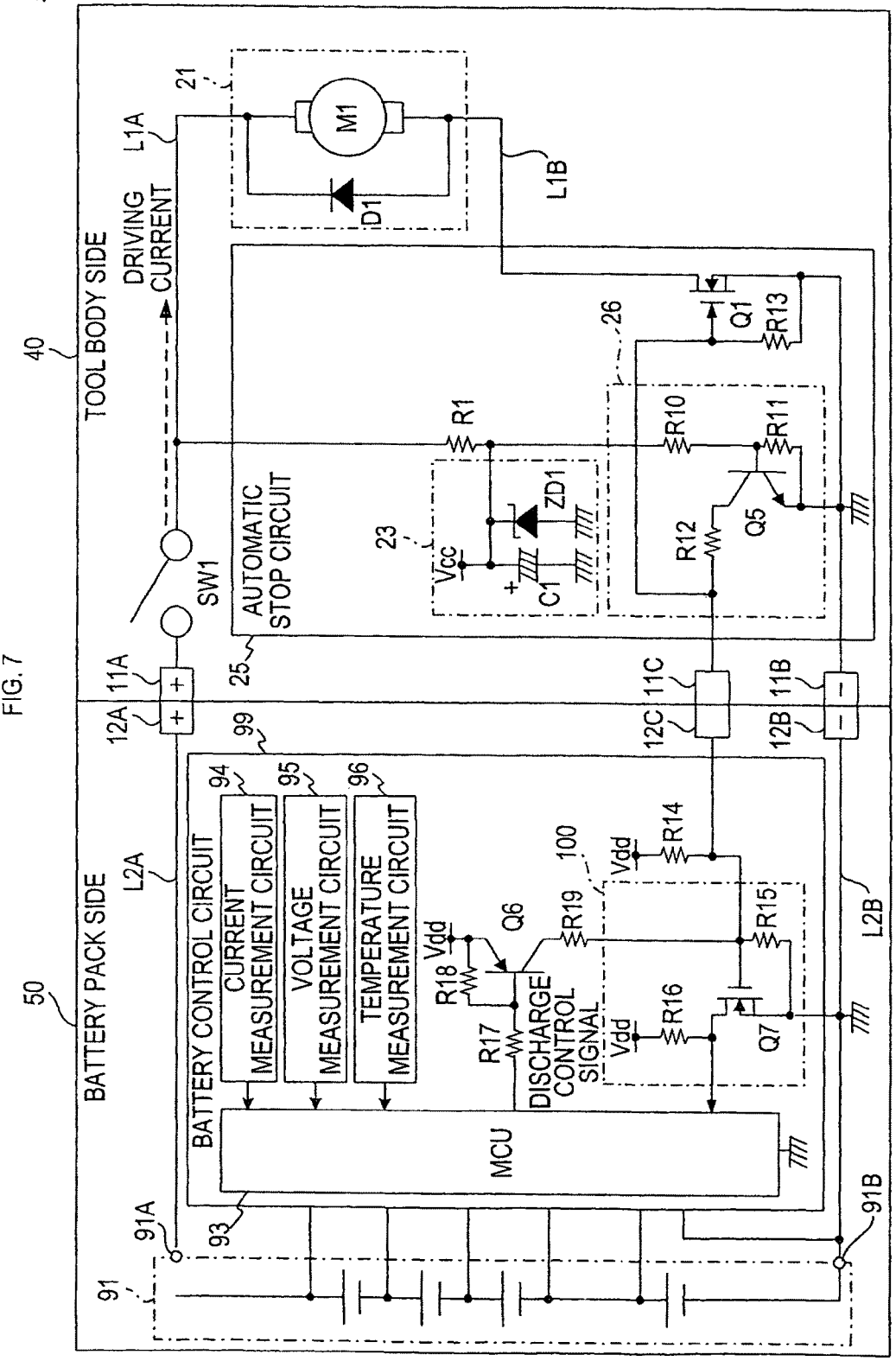
FIG. 7 is a circuit diagram showing a configuration of a part of electronic circuits included in an electric power tool in a second embodiment.

As shown in FIG. 7, a tool body 40 of the electric power tool 30 in the second embodiment includes the main switch SW1, the positive side terminal 11A, the negative side terminal 11B, the signal terminal 11C, the drive circuit 21, and an automatic stop circuit 25.

The automatic stop circuit 25 includes the transistor Q1, the resistor R1, a resistor R13, the control voltage generation circuit 23, and a signal input/output circuit 26.

The signal input/output circuit 26 includes a transistor Q5 and resistors R10, R11, and R12.

The transistor Q5 is an NPN type bipolar transistor. A base of the transistor Q5 is connected via the resistor R10 to the resistor R1 as well as to a ground in the tool body 40 via the resistor R11. Further, the transistor Q5 has an emitter thereof connected to the ground in the body 40 and a collector thereof connected to the signal terminal 11C via the resistor R12 and to the gate of the transistor Q1 via the resistor R12.

The resistor R13 is connected to the gate of the transistor Q1 at one end thereof and connected to the source of the transistor Q1 at the other end thereof.

A battery pack 50 includes the positive side terminal 12A, the negative side terminal 12B, the signal terminal 12C, the battery 91, and a battery control circuit 99.

The battery control circuit 99 includes the MCU 93, the current measurement circuit 94, the voltage measurement circuit 95, the temperature measurement circuit 96, a switch operation detection circuit 100, a transistor Q6, and resistors R14, R17, R18, and R19.

The switch operation detection circuit 100 includes a transistor Q7 and resistors R15 and R16.

The transistor, Q7 is an N-channel type MOSFET and has a gate thereof connected to the signal terminal 12C. Further, the transistor Q7 has a drain thereof connected to an input port of the MCU 93 and a source thereof connected to the ground in the battery pack 50.

The resistor R15 is connected to the gate of the transistor Q7 at one end thereof and connected to the ground in the battery pack 50 at the other end thereof.

The resistor R16 is applied with a control voltage Vdd at one end thereof and connected to the drain of the transistor Q7 at the other end thereof.

The transistor Q6 is a PNP type bipolar transistor and has a base thereof connected to an output port of the MCU 93 via the resistor R17 as well as to an emitter thereof via the resistor R18. The emitter of the transistor Q6 is applied with the control voltage Vdd, while a collector of the transistor Q6 is connected via the resistor R19 to the gate of the transistor Q7.

The resistor R14 has one end thereof applied with the control voltage Vdd and the other end thereof connected to the signal terminal 12C.

In the thus constituted electronic circuit, when the main switch SW1 is turned on, the transistor Q5 in the signal input/output circuit 26 is turned on, to set the logical levels of the voltages at the signal terminals 11C and 12C to LOW. The MCU 93 sets to HIGH the logical level of the voltage in a signal (discharge control signal) inputted to the base of the transistor Q6, to turn off the transistor Q6, thus prohibiting discharge.

When the logical levels of the respective voltages at the signal terminals 11C and 12C are set to LOW, the transistor Q7 in the switch operation detection circuit 100 is turned off, thus setting to HIGH the logical level of the voltage in a signal (operation detection signal) inputted to the MCU 93 from the drain of the transistor Q7. As the logical level of the voltage in the operation detection signal is set to HIGH, the MCU 93 recognizes that the main switch SW1 is turned on.

When the MCU 93 recognizes that the main switch SW1 is turned on, the MCU 93 sets the logical level of the voltage in the discharge control signal to LOW to turn on the transistor Q6, thus permitting discharge.

When the transistor Q6 is turned on, the logical levels of the respective voltages at the signal terminals 11C and 12C are set to HIGH. Thereby the transistor Q1 is turned on, and the drive motor M1 starts to be driven.

That is, the second embodiment is configured such that, in contrast to the first embodiment, when the main switch SW1 is turned on, the logical levels of the respective voltages at the signal terminals 11C and 12C are set to LOW, and that when discharge is permitted, the logical levels of the respective voltages at the signal terminals 11C and 12C are set to HIGH.

The MCU 93 performs the discharge control process conformed to such differences. Thus, the electric power tool 30 in the second embodiment exhibits the same effects as the effects exhibited by the electric power tool 1 in the first embodiment.

Although the embodiments of the present invention have been described above, it is to be appreciated that the present invention is not limited to the above embodiments and can be modified in various manners within the technical scope of the present invention.

For example, in contrast to the aforementioned embodiment in which the present invention is applied to a driver drill, the present invention may be applied to any electric power tool other than the driver drill.

In contrast to the aforementioned embodiment in which the brushed DC motor is used as the drive motor M1, a brushless DC motor or an AC motor may be used instead. In a case where the brushless DC motor or the AC motor is used as the drive motor M1, it may be necessary to modify the drive circuit so that the drive circuit can drive these motors. Those skilled in the art will easily recognize the specific modifications based on the conventional technologies. Therefore, the explanation of the specific modifications will be omitted here.

In contrast to the aforementioned embodiment in which the transistors are a bipolar transistor or an MOSFET respectively, any other switching elements than these may be used.

In contrast to the aforementioned embodiment in which the driver drill is configured so that the battery pack is detachably attached thereto, the driver drill may be configured so that the battery pack cannot be detached.

Further, in contrast to the aforementioned embodiment in which the MCU 93 is a microcomputer, the MCU 93 may be constituted by an ASIC (Application Specific Integrated Circuit) or a programmable logic device such as a FPGA (Field Programmable Gate Array).

Moreover, the specific parameter values disclosed above are mere examples, and any other parameter values may be used in accordance with specifications of electric power tools.

What is claimed is:
1. An electric power tool comprising:
a tool body; and
a battery pack,
the tool body including:
a body side terminal that transfers an electric signal between the tool body and the battery pack;

a drive portion that is electrically connected with the battery pack and supplied with electric power from the battery pack to be driven;

a switch that is operable from outside of the tool body and issues one of a command to drive the drive portion and a command to stop the drive portion in accordance with operation to the switch;

a terminal voltage setting unit that sets a voltage of the body side terminal to a first voltage when the command to drive the drive portion is issued by the switch; and a connection control unit that electrically disconnects the battery pack and the drive portion from each other when the voltage of the body side terminal is set to the first voltage and that electrically connects the battery pack and the drive portion with each other when the voltage of the body side terminal is set to a second voltage different from the first voltage, and the battery pack including:

a battery side terminal that is electrically connected with the body side terminal of the tool body;

a command recognition unit that generates a command recognition signal indicating that the command to drive the drive portion is issued by the switch of the tool body when a voltage of the battery side terminal is set to the first voltage;

a permission determination unit that determines whether or not supply of electric power from the battery pack to the drive portion should be permitted, in accordance with a predetermined determination procedure including at least determination of a status of the command recognition signal; and a voltage changing unit that changes the voltage of the battery side terminal from the first voltage to the second voltage when supply of electric power from the battery pack to the drive portion is permitted by the permission determination unit.

2. The electric power tool according to claim 1, wherein the battery pack comprises a positive electrode that is electrically connected with the drive portion of the tool body, the switch issues the command to drive the drive portion and the command to stop the drive portion by turning on and off an electrical connection between the positive electrode of the battery pack and the drive portion of the tool body, and the terminal voltage setting unit applies the first voltage to the body side terminal when the electrical connection between the positive electrode of the battery pack and the drive portion of the tool body is turned on by the switch.

3. The electric power tool according to claim 2, wherein the terminal voltage setting unit generates the first voltage from a voltage of the positive electrode of the battery pack and applies the generated first voltage to the body side terminal when the electrical connection between the positive electrode of the battery pack and the drive portion of the tool body is turned on by the switch.

4. The electric power tool according to claim 1, wherein the voltage changing unit changes the voltage of the battery side terminal from the first voltage to the second voltage by either one of decreasing the first voltage and applying a voltage higher than the first voltage to the battery side terminal.

5. The electric power tool according to claim 1, wherein the battery pack comprises a sleep mode shift unit that stops operations of a part of electronic circuits included in the battery pack, based on at least a status of the command recognition signal.

6. The electric power tool according to claim 1, wherein the battery pack comprises an over-current determination unit that determines whether or not a magnitude of an electric current flowing into the tool body from the battery pack is greater than a predetermined current value, and the determination procedure includes determination by the over-current determination unit.

7. The electric power tool according to claim 1, wherein the battery pack comprises an over-discharge determination unit that determines whether or not the battery pack is over-discharged, and the determination procedure includes determination by the over-discharge determination unit.

8. The electric power tool according to claim 1, wherein the battery pack comprises a temperature determination unit that determines whether or not a temperature of the battery pack is higher than a predetermined temperature, and the determination procedure includes determination by the temperature determination unit.

9. The electric power tool according to claim 1, wherein the battery pack is detachably attached to the tool body.

10. A tool body comprising:

a body side terminal that transfers an electric signal between the tool body and a battery pack;

a drive portion that is electrically connected with the battery pack and supplied with electric power from the battery pack to be driven;

a switch that is operable from outside of the tool body and issues one of a command to drive the drive portion and a command to stop the drive portion in accordance with operation to the switch;

a terminal voltage setting unit that sets a voltage of the body side terminal to a first voltage when the command to drive the drive portion is issued by the switch; and a connection control unit that electrically disconnects the battery pack and the drive portion from each other when the voltage of the body side terminal is set to the first voltage that indicates issuance of the command to drive the drive portion, and that electrically connects the battery pack and the drive portion with each other when the voltage of the body side terminal is set to a second voltage that is different from the first voltage, and that indicates that supply of electric power from the battery pack to the drive portion is permitted.

11. A battery pack for an electric power tool that supplies electric power to a tool body of the electric power tool, the battery pack comprising:

a battery side terminal that transfers an electric signal between the battery pack and the tool body;

a command recognition unit that generates a command recognition signal indicating that a command to drive a drive portion included in the tool body is issued by a switch included in the tool body when a voltage of the battery side terminal is set to a first voltage;

a permission determination unit that determines whether or not supply of electric power from the battery pack to the drive portion should be permitted, based on a predetermined determination procedure including at least determination of a status of the command recognition signal; and a voltage changing unit that changes the voltage of the battery side terminal from the first voltage to a second voltage different from the first voltage when supply of electric power from the battery pack to drive portion is permitted by the permission determination unit.

* * * * *